(12) United States Patent
Sasaki

(10) Patent No.: US 8,247,094 B2
(45) Date of Patent: Aug. 21, 2012

(54) PERPENDICULAR MAGNETIC RECORDING MEDIUM AND MAGNETIC RECORDING AND REPRODUCING APPARATUS

(75) Inventor: Yuzo Sasaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/681,061

(22) PCT Filed: Oct. 2, 2008

(86) PCT No.: PCT/JP2008/067903
§ 371 (c)(1),
(2), (4) Date: Mar. 31, 2010

(87) PCT Pub. No.: WO2009/044794
PCT Pub. Date: Apr. 9, 2009

(65) Prior Publication Data
US 2010/0247962 A1 Sep. 30, 2010

(30) Foreign Application Priority Data

Oct. 3, 2007 (JP) ................................. 2007-259305

(51) Int. Cl.
*G11B 5/66* (2006.01)
(52) U.S. Cl. ..................... 428/828.1; 428/800; 428/826; 428/827
(58) Field of Classification Search ........................ None
See application file for complete search history.

(56) References Cited

U.S. PATENT DOCUMENTS

| | | | |
|---|---|---|---|
| 6,939,626 B2 * | 9/2005 | Tang | .......................... 428/811.2 |
| 7,470,474 B2 | 12/2008 | Sakawaki et al. | |
| 2002/0012816 A1 | 1/2002 | Shimizu et al. | |
| 2006/0177703 A1 * | 8/2006 | Takenoiri et al. | ............. 428/829 |
| 2006/0204791 A1 * | 9/2006 | Sakawaki et al. | .......... 428/828.1 |
| 2007/0026260 A1 * | 2/2007 | Nemoto et al. | ............... 428/831 |
| 2007/0218317 A1 | 9/2007 | Kurita et al. | |
| 2009/0231755 A1 | 9/2009 | Takahashi et al. | |

FOREIGN PATENT DOCUMENTS

CN 1577507 A 2/2005

(Continued)

OTHER PUBLICATIONS

R. H. Victora, et al., "Composite Media for Perpendicular Magnetic Recording," IEEE Transactions on Magnetics, Feb. 2, 2005, pp. 537-542, vol. 41, No. 2.

*Primary Examiner* — Mark Ruthkosky
*Assistant Examiner* — Gary Harris
(74) *Attorney, Agent, or Firm* — Sughrue Mion, PLLC

(57) ABSTRACT

The present invention relates to a perpendicular magnetic recording medium including a nonmagnetic substrate, and at least a soft magnetic layer (SUL), an alignment control layer, a magnetic recording layer and a protective layer formed on the nonmagnetic substrate; wherein the magnetic recording layer is constituted of three or more layers and includes a first magnetic recording layer, a second magnetic recording layer and a third magnetic recording layer from the substrate side, and also includes an exchange coupling reduction layer for reducing exchange coupling of both layers between the second magnetic recording layer and the third magnetic recording layer and, regarding magnetocrystalline anisotropic energy $K_u$ of each magnetic recording layer, the first magnetic recording layer has $4 \times 10^6$ erg/cc or higher, the second magnetic recording layer has $2 \times 10^6$ erg/cc or lower and the third magnetic recording layer has $1 \times 10^6$ erg/cc or lower. The present invention also relates to a magnetic recording and reproducing apparatus using the perpendicular magnetic recording medium.

14 Claims, 1 Drawing Sheet

FOREIGN PATENT DOCUMENTS

| | | |
|---|---|---|
| CN | 1802697 A | 7/2006 |
| JP | 2002-334424 A | 11/2002 |
| JP | 2002334424 A * | 11/2002 |
| JP | 2006-48900 A | 2/2006 |
| JP | 2006-351058 A | 12/2006 |
| JP | 2007-250150 A | 9/2007 |
| JP | 2008-243316 A | 10/2008 |
| WO | 2008/132880 A1 | 11/2008 |

* cited by examiner

PERPENDICULAR MAGNETIC RECORDING MEDIUM AND MAGNETIC RECORDING AND REPRODUCING APPARATUS

TECHNICAL FIELD

The present invention relates to a perpendicular magnetic recording medium, and a magnetic recording and reproducing apparatus using the perpendicular magnetic recording medium.

BACKGROUND ART

In recent years, the range of applications for magnetic recording apparatuses such as magnetic disk drives, flexible disk drives and magnetic tape drives has been markedly increased and the importance of such apparatuses has also increased. Also, the recording density of the magnetic recording media used in such apparatuses is being largely increased. In particular, a steeper increase in areal recording density followed the introduction of an MR head and a PRML technique in a hard disk drive (HDD). Since the introduction of a GMR head and a TuMR head in recent years, the recording density has been increasing at a pace of about 100% per year.

As a magnetic recording system of HDD, a so-called perpendicular magnetic recording system has recently extended its applications rapidly as a technique to replace a conventional longitudinal magnetic recording system. In the perpendicular magnetic recording system, crystal grains of a recording layer for recording information has an easy axis of magnetization in the direction perpendicular to a substrate. The easy axis of magnetization is an axis in a direction of which magnetization easily points. In the case of a conventionally used Co-based alloy, the easy axis of magnetization is an axis (c-axis) parallel to the normal line of a (002) crystal plane of a hexagonal closest-packed structure of Co. Therefore, an influence of a demagnetizing field between recording bits is small even when the recording density increases, and the magnetization is magnetostatically stable.

In ordinary cases, a perpendicular magnetic recording medium has a seed layer, an intermediate layer, a magnetic recording layer and an overcoat formed in this order on a nonmagnetic substrate. Also, in many cases, a lubricating layer is applied on the surface after film forming of the overcoat. Also, a magnetic film called a soft-magnetic under layer is ordinarily provided under the seed layer. The seed layer and the intermediate layer are formed for the purpose of further improving the characteristics of the magnetic recording layer. Specifically, they have a function of aligning crystals in the magnetic recording layer and also of controlling the shape of magnetic grains.

In order to increase the recording density of the perpendicular magnetic recording medium, it is necessary to realize low noise while maintaining thermal stability. Two methods are ordinarily used so as to reduce noise. One method is a method of decreasing the magnetic interaction between magnetic crystal grains in the intra-film plane direction by magnetically separating and isolating magnetic crystal grains of the recording layer. Another method is a method of decreasing the grain size of magnetic crystal grains. The method includes, for example, a method of adding $SiO_2$ to the recording layer to form a perpendicular magnetic recording layer having a so-called granular structure in which magnetic crystal grains are surrounded with the grain boundary region containing a large amount of $SiO_2$. However, when the noise is reduced by such a method, it is necessary to increase the perpendicular magnetic anisotropy ($K_u$) of magnetic crystal grains so as to ensure thermal stability. However, when the magnetic anisotropy energy is increased, $H_c$ and $H_{c0}$ increase and writing at the recording head becomes insufficient, resulting in a problem such as deterioration of reproducing characteristics.

As a method for solving the problem, a so-called composite media has been proposed in which an auxiliary layer made of soft magnetic grains is provided on or under the perpendicular magnetic recording layer (main recording layer) having the above granular structure (for example, Non-Patent Document 1, Patent Document 1). Because of exchange coupling between a hard magnetic film as the main recording layer and a soft magnetic film as the auxiliary layer, it becomes possible to invert at a lower applied magnetic field than that of a conventional perpendicular magnetic recording medium if the auxiliary layer portion initiates magnetization inversion upon application of the magnetic field from the head first. It is also possible to control exchange coupling between the main recording layer and the auxiliary layer thereby designing a perpendicular magnetic recording medium having optimum characteristics by providing a nonmagnetic film between the main recording layer and the auxiliary layer.

However, it is difficult to control exchange coupling between the main recording layer and the auxiliary layer and, as a result of deviation from the range of optimum exchange coupling, the gradation of a hysteresis loop $R_S$ decreases to less than 1 by integrating the main recording layer with the auxiliary layer whose material has a low $K_u$ value, unfavorably resulting in an insufficient improvement of heat fluctuation resistance.

Non-Patent Document 1:
IEEE Transaction on Magnetics, Vol. 41, pp. 537
Patent Document 1:
Japanese Patent Application No. 2005-172601

DISCLOSURE OF THE INVENTION

Problems to be Solved by the Invention

Under these circumstances, the present invention has been made and an object thereof is to provide a perpendicular magnetic recording medium which has both satisfactory thermal stability, and recording and reproducing characteristics, and also enables high recording density by controlling exchange coupling between a main recording layer and an auxiliary layer, and a magnetic recording apparatus using the same.

Means for Solving the Problems

In order to achieve the above object, the present invention provides the aspects shown below.
(1) A perpendicular magnetic recording medium including a nonmagnetic substrate, and at least a soft magnetic layer (SUL), an alignment control layer, a magnetic recording layer and a protective layer formed on the nonmagnetic substrate; wherein the magnetic recording layer is constituted of three or more layers and includes a first magnetic recording layer, a second magnetic recording layer and a third magnetic recording layer from the substrate side, and also includes an exchange coupling reduction layer for reducing exchange coupling of both layers between the second magnetic recording layer and the third magnetic recording layer and, regarding magnetocrystalline anisotropic energy $K_u$ of each magnetic recording layer, the first magnetic recording layer has $4\times10^6$ erg/cc or higher, the second magnetic recording layer has $2\times10^6$ erg/cc or lower and the third magnetic recording layer has $1\times10^6$ erg/cc or lower.

(2) The perpendicular magnetic recording medium according to (1), which includes an exchange coupling control layer for exchange coupling of both layers between the first magnetic recording layer and the second magnetic recording layer.

(3) The perpendicular magnetic recording medium according to (2), wherein the exchange coupling control layer is made of Ru, Re or an alloy material thereof and has a hexagonal closest-packed structure.

(4) The perpendicular magnetic recording medium according to any one of (1) to (3), wherein the exchange coupling reduction layer is made of a CoCr alloy and contains 30 atomic % or more of Cr.

(5) The perpendicular magnetic recording medium according to any one of (1) to (3), wherein the exchange coupling reduction layer is made of an alloy material which contains at least one element selected from the group of elements having a face-centered cubic structure as a main component, and elements selected from the group of elements having a body-centered cubic structure, and also has both a (111) plane-aligned crystalline structure and an irregular layer lattice (stacking fault) formed by mixing a face-centered cubic structure with a body-centered cubic structure.

(6) The perpendicular magnetic recording medium according to any one of (1) to (3), wherein the exchange coupling reduction layer is made of an alloy material which contains at least one element selected from the group of elements having a face-centered cubic structure as a main component, and elements selected from the group of elements having a hexagonal closest-packed structure, and also has both a (111) plane-aligned crystalline structure and an irregular layer lattice (stacking fault) formed by mixing a face-centered cubic structure with a hexagonal closest-packed structure.

(7) The perpendicular magnetic recording medium according to any one of (1) to (6), wherein the film thickness of the exchange coupling reduction layer is within a range from 1.5 nm to 3 nm.

(8) The perpendicular magnetic recording medium according to any one of (1) to (7), wherein the first magnetic recording layer has a granular structure constituted of magnetic Co alloy crystal grains and crystal grain boundaries made of a nonmagnetic oxide or nitride.

(9) The perpendicular magnetic recording medium according to any one of (1) to (8), wherein the third magnetic recording layer is constituted of two layers, a nonmagnetic thin film is interposed between the two layers constituting the third magnetic recording layer, and an antiferromagnetic coupling is produced between the two layers constituting the third magnetic recording layer.

(10) A magnetic recording and reproducing apparatus including a magnetic recording medium, and a magnetic head for recording information on the magnetic recording medium and reproducing information from the magnetic recording medium, wherein the magnetic recording medium is the magnetic recording medium according to any one of (1) to (9).

Effects of the Invention

According to the present invention, it is possible to provide a perpendicular magnetic recording medium which has excellent thermal stability, and also has excellent high recording density characteristics.

Description of Reference Numerals

| | |
|---|---|
| 1 | Nonmagnetic substrate |
| 2 | Soft magnetic layer (SUL) |
| 3 | Seed layer |
| 4 | Intermediate layer |
| 5-1 | First magnetic recording layer |
| 5-2 | Exchange coupling control layer |
| 5-3 | Second magnetic recording layer |
| 5-4 | Exchange coupling reduction layer |
| 5-5 | Third magnetic recording layer |
| 6 | Protective layer |
| 100 | Magnetic recording medium |
| 101 | Medium drive unit |
| 102 | Magnetic head |
| 103 | Head drive unit |
| 104 | Recording and reproduction signal processing system |

BEST MODE FOR CARRYING OUT THE INVENTION

Figure 1:
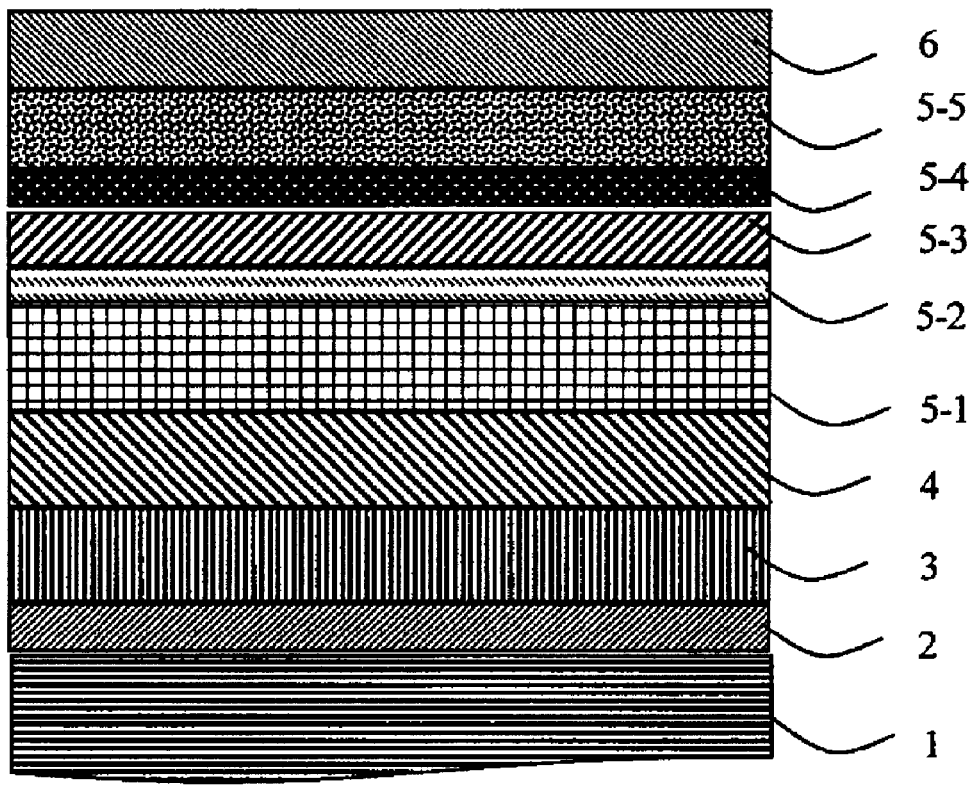
FIG. 1 is a diagram showing a cross-sectional structure of a perpendicular magnetic recording medium according to the present invention.

FIG. 1 is a cross-sectional view showing an example of a perpendicular magnetic recording medium according to the present invention.

The perpendicular magnetic recording medium 100 of the present invention has a structure, for example, wherein on a nonmagnetic substrate 1, at least a soft magnetic layer (SUL) 2, a seed layer 3 and an intermediate layer 4 constituting an alignment control layer for controlling the alignment of a film immediately above, a perpendicular magnetic layer 5, and a protective layer 6 are stacked in this order. The perpendicular magnetic recording layer 5 is constituted of a first recording layer 5-1 as a main recording layer, an exchange coupling control layer 5-2, a second magnetic recording layer 5-3 as an auxiliary layer, an exchange coupling reduction layer 5-4 and a third magnetic recording layer 5-5.

As the nonmagnetic substrate used in the magnetic recording medium of the present invention, any nonmagnetic substrate such as an Al alloy substrate containing Al as a main component, for example, an Al—Mg alloy, or a substrate made of ordinary soda glass, aluminosilicate glass, amorphous glass, silicon, titanium, ceramic, sapphire, quartz, or any of various resins, can be used. Among these substrates, an Al alloy substrate or a glass substrate made of crystallized glass or amorphous glass etc. is often used. In the case of a glass substrate, a mirror-polished substrate and a low-Ra substrate of Ra<1 (Å) are preferable. The substrate may have a texture if it is insignificant.

In ordinary cases of a process of manufacturing a magnetic disk, cleaning and drying of a substrate are first performed. Also in the present invention, in terms of ensuring adhesion of each layer, it is desirable to perform cleaning and drying before forming of the layer. Cleaning includes cleaning by etching (inverse sputtering) as well as cleaning with water. The substrate size is not particularly specified.

The soft magnetic layer (SUL) is provided in many perpendicular magnetic recording media. The soft magnetic layer (SUL) has the function of introducing a recording magnetic field from a head to efficiently apply a perpendicular component of the recording magnetic field to the magnetic recording layer at the time of recording a signal on the medium. As the material of the soft magnetic layer (SUL), a material having soft magnetic characteristics, such as a FeCobased alloy, a CoZrNb-based alloy or a CoTaZr-based alloy can be used. It is particularly preferable that the soft magnetic layer is of an amorphous structure, because taking an amorphous structure is effective in preventing an increase in surface roughness (Ra) and enables a reduction in the amount of floating of the head and further increasing the recording density. Not only the single soft magnetic layer but also a combination of two soft magnetic layers between which an extremely thin nonmagnetic thin film of Ru is interposed for an antiferromagnetic coupling is preferable. The total thickness of the soft magnetic layer (SUL) is from about 20 to 120 nm. However, it is appropriately determined according to the balance between the recording and reproducing characteristics, and the overwrite characteristics.

The alignment control layer is constituted of a plurality of layers and includes so-called seed and intermediate layers from the substrate side. The seed layer has the function of controlling the grain size and crystal alignment of the intermediate layer and the magnetic recording layer. The material of the seed layer is preferably Ta, Ni having a (111) plane-aligned face-centered cubic crystalline structure, or a Ni alloy such as Ni—Nb, Ni—Ta, Ni—V or Ni—W.

When the soft magnetic layer (SUL) has an amorphous structure, Ra may increase according to the material and film forming conditions. Therefore, Ra is decreased by forming a nonmagnetic amorphous layer between the soft magnetic layer (SUL) and the seed layer, thus making it possible to improve the alignment of the magnetic recording layer.

Similar to the magnetic recording layer, the material of the intermediate layer is preferably a material having a hexagonal closest-packed structure, such as Ru, Re, or an alloy thereof. Since the intermediate layer has the function of controlling the alignment of the magnetic recording layer, the material for controlling the alignment of the magnetic recording layer can be used even if it does not have a hexagonal closest-packed structure. The total thickness of the alignment control layer is preferably 5 (nm) or more and 20 (nm) or less according to the balance between the recording and reproducing characteristics, and the overwrite characteristics. When the magnetic recording layer having a granular structure is used as the magnetic recording layer, segregation to the crystal grain boundaries of the nonmagnetic oxide or nitride is promoted by increasing the surface unevenness of the intermediate layer. Therefore, the gas pressure at the time of film forming of the intermediate layer is preferably 3 (Pa) or more, and more preferably 10 (Pa) or more.

The perpendicular magnetic recording layer in the present invention is a main recording layer and is constituted of a first magnetic recording layer having the highest $K_u$ value among the three layers constituting the magnetic recording layer, an exchange coupling control layer for increasing exchange coupling between the first magnetic recording layer and a second magnetic recording layer, a second magnetic recording layer which is an auxiliary layer and has second highest $K_u$ value, an exchange coupling reduction layer for reducing exchange coupling between the second magnetic recording layer and a third magnetic recording layer, and a third magnetic recording layer having the lowest $K_u$ value.

The first magnetic recording layer is the layer in which a signal is actually recorded and $K_u$ is preferably $4\times10^6$ (erg/cc) or higher. It is preferable that at least one layer of the first magnetic recording layer in the present invention has a granular structure constituted of ferromagnetic crystal grains and crystal grain boundaries made of a nonmagnetic oxide or nitride. Furthermore, it is more preferable that at least one layer of the first magnetic recording layer in the present invention has a granular structure constituted of ferromagnetic crystal grains and crystal grain boundaries made of a nonmagnetic oxide.

It is preferable to use, as the ferromagnetic material in the magnetic recording layer, material prepared by using Co and Pt as essential components and adding an oxide or nitride for formation of a granular structure. Examples thereof include CoCrPt—Si oxide, CoCrPt—Ti oxide, CoCrPt—W oxide, CoCrPt—Cr oxide, CoCrPt—Co oxide, CoCrPt—Ta oxide, CoCrPt—Ru oxide, CoRuPt—Si oxide, CoCrPtRu—Si oxide, CoCrPt—Si nitride, CoCrPt—Ti nitride, CoCrPt—W nitride, CoCrPt—Cr nitride, CoCrPt—Co nitride, CoCrPt—Ta nitride, CoCrPt—Ru nitride, CoRuPt—Si nitride and CoCrPtRu—Si nitride. It is also possible to add two or more kinds of oxides or nitrides.

It is preferable that $K_u$ of the first magnetic recording layer used in the present invention is adjusted to be within a range from $4\times10^6$ (erg/cc) to $7\times10^6$ (erg/cc) so as to achieve the above effect.

The average grain size of magnetic crystal grains forming the first magnetic recording layer is preferably 3 (nm) or more and 12 (nm) or less. The average grain boundary width is preferably 0.3 (nm) or more and 2.0 (nm) or less. The average crystal grain size and the average grain boundary width can be calculated using planar TEM observation images.

The total amount of the oxide existing in the first magnetic recording layer is preferably from 3 to 15 (mol %). When the total amount of the oxide is within the above range, a satisfactory granular structure can be formed.

The first magnetic recording layer may have a multilayered structure constituted of two or more layers made of these materials. In that case, at least one layer has the above granular structure.

As the material of the exchange coupling control layer, a nonmagnetic material can be used. The material is appropriately determined, but is preferably Ru, Re or an alloy material thereof having a hexagonal closest-packed structure.

In the constitution of the present invention, the second magnetic recording layer plays the role of the auxiliary layer, and it is preferable that the $K_u$ thereof be lower than that of the material of the first magnetic recording layer and is $2\times10^6$ (erg/cc) or lower. Ferromagnetic exchange coupling between the first magnetic recording layer and the second magnetic recording layer causes magnetization inversion at a lower external magnetic field than that when the second magnetic recording layer does not exist. When exchange coupling between the first and second magnetic recording layers is moderately strong, the second magnetic recording layer having a low $K_u$ value initiates magnetization inversion first, and the first magnetic recording layer also causes magnetization inversion by exchange coupling between the first and second magnetic recording layers so as to be drawn to the second magnetic recording layer (magnetization inversion mode called incoherent rotation). In such a case, since the magnetic moment of the first magnetic recording layer gradually inverts, thermal stability of the entire medium is maintained. Furthermore, since the overwrite characteristics are improved, the recording and reproducing characteristics are also improved. When exchange coupling between the first and second magnetic recording layers deviates from a proper range, the magnetic moment of the first magnetic recording layer and that of the second magnetic recording layer simultaneously inverts (magnetization inversion mode called coherent rotation) and thus the $K_u$ value of two layers is simply averaged and the thermal stability deteriorates.

$K_u$ of the second magnetic recording layer used in the present invention is preferably adjusted to be within the range from $1.2 \times 10^6$ (erg/cc) to $2 \times 10^6$ (erg/cc) so as to achieve the above effect.

Heretofore, exchange coupling between two layers constituting the magnetic recording layer has been controlled by the film thickness of the control layer. However, within the range of the strength of exchange coupling where incoherent rotation arises, the strength of the interaction of the exchange coupling control layer largely varies with the film thickness. Therefore, film thickness distribution of the exchange coupling control layer directly leads to distribution of the strength of exchange coupling and it is difficult to control. Therefore, in the present invention, optimization of the interaction between the first and second magnetic recording layers is not controlled by only the film thickness of the exchange coupling control layer, but the distribution of the strength of the interaction due to the film thickness distribution is suppressed by introducing a third magnetic recording layer.

The film thickness of the exchange coupling control layer of the present invention is preferably within a range from 1 to 1.5 (nm) where the interaction between the two layers constituting the magnetic recording layer is ferromagnetic and also the strength of the interaction slightly varies with the change of the film thickness. Thus, it becomes possible to suppress the distribution of the strength of the interaction due to the film thickness distribution. However, the strength itself of exchange coupling decreases and incoherent rotation is unlikely to occur. Therefore, in the present invention, a third magnetic recording layer having a lower $K_u$ value is formed on the second magnetic recording layer and an exchange coupling reduction layer is inserted therebetween. The $K_u$ of the third magnetic recording layer is preferably $1 \times 10^6$ (erg/cc) or lower. Therefore, the third magnetic recording layer having the lowest $K_u$ among three layers begins to inverse first to the external magnetic field. Since exchange coupling between the second and third magnetic recording layers decreases by the exchange coupling reduction layer, the second magnetic recording layer cannot cause magnetization inversion simultaneously with the third magnetic recording layer and the magnetic moment of the third magnetic recording layer converted first plays a role of suppressing inversion of the second magnetic recording layer. The suppressive action to the second magnetic recording layer increases exchange coupling between the first and second magnetic recording layers to cause incoherent rotation.

It is possible to reduce exchange coupling between two layers constituting the magnetic recording layer as compared with the case where the third magnetic recording layer is directly formed on the second magnetic recording layer by inserting the exchange coupling reduction layer. As the material of the exchange coupling reduction layer of the present invention, a nonmagnetic material can be used. The nonmagnetic material is preferably a CoCr alloy containing 30 (atomic %) or more of Cr, or an alloy of an element having a face-centered cubic structure and an element having a body-centered cubic structure or a hexagonal closest-packed structure, which has both a (111) crystal plane alignment of a face-centered cubic structure and an irregular layer lattice (stacking fault). The film thickness of the exchange coupling reduction layer is preferably within a range from 1.5 to 3 (nm). When the film thickness of the exchange coupling reduction layer is within the above range, similar to the exchange coupling control layer, exchange coupling slightly varies with the change of the film thickness, and thus an influence of the film thickness distribution can be suppressed.

The third magnetic recording layer of the present invention has a constitution in which an extremely thin film made of Ru (nonmagnetic thin film) etc. are interposed between the layers and it is preferable that two upper and lower layers made of Ru be antiferromagnetically bonded. Therefore, a state where no magnetic field is applied from the outside is a magnetically stable state. In the case of recording, the overwrite characteristics and the recording and reproducing characteristics can be improved when the third magnetic recording layer performs a conventional soft magnetic function by magnetic field from a head. The reason why the constitution of the present invention enables reconcilement among thermal stability, overwrite characteristics and recording and reproducing characteristics is not simple and is not clear at the present.

The $K_u$ of the third magnetic recording layer used in the present invention is $1 \times 10^6$ (erg/cc) or lower and is preferably adjusted to be within a range from $0.1 \times 10^6$ (erg/cc) to $1 \times 10^6$ (erg/cc) so as to achieve the above effect.

The protective layer is a layer for protecting the medium from damage caused by contact with a head. A carbon film or a $SiO_2$ film etc. is used as the protective layer, and the carbon film is ordinarily used. For forming of the film, a sputtering or plasma CVD method etc. is used, and the plasma CVD method has been ordinarily used in recent years. A magnetron plasma CVD can also be used. The film thickness is from about 1 (nm) to 10 (nm), preferably from about 2 (nm) to 6 (nm), and more preferably from 2 (nm) to 4 (nm).

Figure 2:
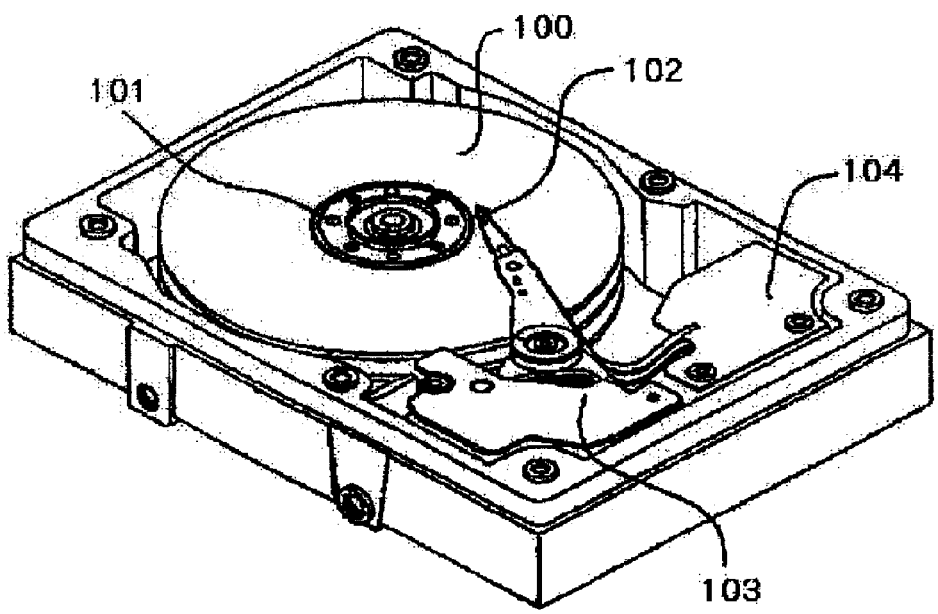
FIG. 2 is a diagram showing a structure of a perpendicular magnetic recording and reproducing apparatus according to the present invention.

FIG. 2 shows an example of a perpendicular magnetic recording and reproducing apparatus using the above perpendicular magnetic recording medium. The perpendicular magnetic recording and reproducing apparatus shown in FIG. 2 includes the magnetic recording medium 100 having the structure shown in FIG. 1, a medium drive unit 101 which drives and rotates the magnetic recording medium 100, a magnetic head 102 which records information on the magnetic recording medium 100 or reproduces information from the magnetic recording medium 100, a head drive unit 103 which moves the magnetic head 102 relative to the magnetic recording medium 100, and a recording and reproduction signal processing system 104.

The recording and reproduction signal processing system 104 can process data supplied from the outside to obtain a recording signal, supply the recording signal to the magnetic head 102, and process a reproduction signal from the magnetic head 102 to send data to the outside.

As the magnetic head 102 used in the magnetic recording and reproducing apparatus of the present invention, any of magnetic heads suitable for higher-density magnetic recording, those having a GMR element using a giant magnetoresistive (GMR) effect and a TuMR element using a tunneling effect can be used.

EXAMPLES

The present invention will be explained below by way of Examples.

Example 1, Comparative Example 1

A 2.5 inch hard disk-shaped glass substrate (MEL3, manufactured by Konica Minolta Holdings, Inc.) was introduced into a vacuum chamber of a sputtering system, Model C-3040, manufactured by ANELVA Corporation. After adjusting the vacuum degree of the sputtering system to $1 \times 10^{-5}$ (Pa) or lower, a Cr film having a film thickness of 10 (nm) as an adhesion layer, and a 70Co-20Fe-5Ta-5Zr film having a film thickness of 30 (nm), a Ru film having a film thickness of 0.8 (nm) and a 70Co-20Fe-5Ta-5Zr film having a film thickness of 30 (nm) as soft magnetic layers were formed. Subsequently, a 90Ni-10W film having a film thickness of 5 (nm) as a seed film and a Ru film having a film thickness of 15 (nm) as an intermediate layer were formed. In the case of sputtering, using an Ar gas, a soft magnetic layer (SUL) and a Ni-10W film were formed at a gas pressure of 0.8 (Pa), while a Ru underlayer was formed at a gas pressure of 8 (Pa).

As the magnetic recording layer, a 92(66Co-16Cr-22Pt)-8(SiO$_2$) film (Ku=5.6×10$^6$ erg/cc) having a film thickness of 12 nm as a first recording layer and a Ru film having a film thickness of 1.2 (nm) as an exchange coupling control layer were formed. Subsequently, as a second magnetic recording layer, a 92(85Co-10Cr-5Pt)-8(SiO$_2$) film (Ku=1.7×10$^6$ erg/cc) having a film thickness of 6 nm was formed. In the case of sputtering, using an Ar gas, first and second magnetic recording layers were formed at a gas pressure 5 (Pa), while an exchange coupling control layer was formed at a gas pressure of 0.8 (Pa). Furthermore, as an exchange coupling reduction layer, Co40Cr, Pd30Mo and Pd30Ti films, each having a thickness 2.5 (nm), were formed at an Ar gas pressure of 0.8 (Pa) (Examples 1-1 to 1-3). On the exchange coupling reduction layer, as a third magnetic recording layer, a 92(75Co25Cr)-8(SiO$_2$) film (Ku=0.7×10$^6$ erg/cc) having a film thickness of 5 nm was formed at an Ar gas pressure of 5 Pa. In Comparative Examples, an exchange coupling control layer having a film thickness of 0.0, 0.4, 0.8 or 1.2 nm was formed, and an exchange coupling reduction layer and a third magnetic recording layer were not formed. Alternatively, an exchange coupling control layer having a film thickness of 1.2 nm was formed and an exchange coupling reduction layer was not formed (Comparative Examples 1-1 to 1-5). Finally, a carbon protective film having a film thickness of 4 (nm) was formed by a CVD method to obtain a perpendicular magnetic recording medium.

To the resulting perpendicular magnetic recording medium, a lubricant was applied, and the recording and reproducing characteristics were evaluated by using a Read Write Analyzer 1632 and a Spinstand S1701 MP manufactured by Guzik, USA. Regarding the recording and reproducing characteristics, a signal-to-noise ratio: SNR (where S denotes an output at a linear recording density of 576 kFCI, and N denotes a root mean square (rms) value at a linear recording density of 576 kFCI) and an OW value (reproduction output ratio decay rate of a signal of 576 kFCI before and after over-writing of a signal of a linear recording density of 77 kFCI after recording a signal of a linear recording density of 576 kFCI) were evaluated.

Subsequently, magnetostatic characteristics were evaluated by a Kerr measuring apparatus (manufactured by Neoark Corporation). In order to examine crystal alignment of CoCrPt magnetic crystals of the magnetic recording layer, a rocking curve of a magnetic layer was measured by an X-ray diffractometer (manufactured by Philips Electronics). As a result, it could be confirmed that the resultant film shows very small crystal alignment variation such as 3.5°. Finally, planar TEM observation of a main recording layer of the magnetic recording layer was performed and the crystal grain size of magnetic crystals was observed. As a result, it was confirmed that the main recording layer has a clear granular structure, an average crystal grain size of 7.5 nm and an average grain boundary width of 0.8 nm.

With respect to Examples and Comparative Examples, the measurement results of SNR, OW, coercive force (Hc) and reverse magnetic domain nucleus forming magnetic field (−Hn) are shown in Table 1. 1 Oe is about 79 A/m.

In Comparative Examples 1-1 to 1-4, when exchange coupling is controlled by only the exchange coupling control layer, the magnetization inversion mode does not become incoherent. Therefore, Hn decreases and the thermal stability cannot be maintained. Furthermore, in Comparative Example 1-5, even when a third magnetic recording layer is formed similarly to in the Examples, there is no exchange coupling reduction layer and the second magnetic recording layer and the third magnetic recording layer cause ferromagnetically strong exchange coupling, and thus the second and third magnetic recording layers simultaneously cause magnetization inversion.

TABLE 1

| Samples | Exchange coupling control layer: Ru | Exchange coupling reduction layer | Third magnetic recording layer | SNR (dB) | OW (dB) | Hc (Oe) | −Hn (Oe) |
|---|---|---|---|---|---|---|---|
| Example 1-1 | 1.2 (nm) | Co40Cr | Formed | 16.7 | 35.6 | 4023 | −1982 |
| Example 1-2 | | Pd30Mo | | 16.4 | 34.9 | 4153 | −2042 |
| Example 1-3 | | Pd30Ti | | 16.4 | 34.4 | 4105 | −2103 |
| Comparative Example 1-1 | 0.0 (nm) | None | None | 15.2 | 40.2 | 3428 | −1174 |
| Comparative Example 1-2 | 0.4 (nm) | | | 13.5 | 42.0 | 3205 | −1242 |
| Comparative Example 1-3 | 0.8 (nm) | | | 12.0 | 44.9 | 2723 | −782 |
| Comparative Example 1-4 | 1.2 (nm) | | | 11.8 | 45.2 | 2632 | −621 |
| Comparative Example 1-5 | 1.2 (nm) | None | Formed | 10.2 | 48.0 | 2231 | 21 |

INDUSTRIAL APPLICABILITY

The perpendicular magnetic recording medium and the magnetic recording and reproducing apparatus using the magnetic recording medium of the present invention can be used in the field of an information technique, and has high industrial applicability.

The invention claimed is:
1. A perpendicular magnetic recording medium comprising a nonmagnetic substrate, and at least a soft magnetic layer (SUL), an alignment control layer, a magnetic recording layer and a protective layer formed on the nonmagnetic substrate;
    wherein the magnetic recording layer
    is constituted of three or more layers
    and includes a first magnetic recording layer, a second magnetic recording layer and a third magnetic recording layer from the substrate side, and includes an exchange coupling control layer for exchange coupling of both layers between the first magnetic recording layer and the second magnetic recording layer, and also includes an exchange coupling reduction layer for reducing exchange coupling of both layers between the second magnetic recording layer and the third magnetic recording layer and, regarding magnetocrystalline anisotropic energy $K_u$ of each magnetic recording layer, the first magnetic recording layer has $4 \times 10^6$ erg/cc or higher, the second magnetic recording layer has $2 \times 10^6$ erg/cc or lower, the third magnetic recording layer has $1 \times 10^6$ erg/cc or lower, and $K_u$ of the second magnetic recording layer is higher than that of the third magnetic recording layer.

2. The perpendicular magnetic recording medium according to claim 1, wherein the exchange coupling control layer is made of Ru, Re or an alloy material thereof and has a hexagonal closest-packed structure.

3. The perpendicular magnetic recording medium according to claim 1, wherein the exchange coupling reduction layer is made of a CoCr alloy and contains 30 atomic % or more of Cr.

4. The perpendicular magnetic recording medium according to claim 1, wherein the exchange coupling reduction layer is made of an alloy material which contains at least one element selected from the group of elements having a face-centered cubic structure as a main component, and elements selected from the group of elements having a body-centered cubic structure, and also has both a (111) plane-aligned crystalline structure and an irregular layer lattice formed by mixing a face-centered cubic structure with a body-centered cubic structure.

5. The perpendicular magnetic recording medium according to claim 1, wherein the exchange coupling reduction layer is made of an alloy material which contains at least one element selected from the group of elements having a face-centered cubic structure as a main component, and elements selected from the group of elements having a hexagonal closest-packed structure, and also has both a (111) plane-aligned crystalline structure and an irregular layer lattice formed by mixing a face-centered cubic structure with a hexagonal closest-packed structure.

6. The perpendicular magnetic recording medium according to claim 1, wherein the film thickness of the exchange coupling reduction layer is within a range from 1.5 nm to 3 nm.

7. The perpendicular magnetic recording medium according to claim 1, wherein the first magnetic recording layer has a granular structure constituted of magnetic Co alloy crystal grains and crystal grain boundaries made of a nonmagnetic oxide or nitride.

8. The perpendicular magnetic recording medium according to claim 1, wherein the third magnetic recording layer is constituted of two layers, a nonmagnetic thin film is interposed between the two layers constituting the third magnetic recording layer, and an antiferromagnetic coupling is produced between the two layers constituting the third magnetic recording layer.

9. A magnetic recording and reproducing apparatus comprising a magnetic recording medium, and a magnetic head for recording information on the magnetic recording medium and reproducing information from the magnetic recording medium, wherein the magnetic recording medium is the magnetic recording medium according to claim 1.

10. The perpendicular recording medium according to claim 1, wherein the magnetocrystalline anistrophy energy $K_u$ of the second magnetic recording layer is $1.2 \times 10^6$ to $2 \times 10^6$ erg/cc.

11. The perpendicular recording medium according to claim 1, wherein the magnetocrystalline anistrophy energy $K_u$ of the third magnetic recording layer is $0.1 \times 10^6$ to $1 \times 10^6$ erg/cc.

12. The perpendicular recording medium according to claim 10, wherein the magnetocrystalline anisotropic energy $K_u$ of the third magnetic recording layer is $0.1 \times 10^6$ to $1 \times 10^6$ erg/cc.

13. A perpendicular magnetic recording medium comprising a non-magnetic substrate, and at least a soft magnetic layer (SUL), an alignment control layer, a magnetic recording layer and a protective layer formed on the non-magnetic substrate;

wherein the magnetic recording layer is constituted of three or more layers and includes a first magnetic recording layer, a second magnetic recording layer and a third magnetic recording layer from the substrate side, and includes an exchange coupling control layer for exchange coupling of both layers between the first magnetic recording layer and the second magnetic recording layer, and also includes an exchange coupling reduction layer for reducing exchange coupling of both layers between the second magnetic recording layer and the third magnetic recording layer and, regarding magnetocrystalline anisotropic energy $K_u$ of each magnetic recording layer, the first magnetic recording layer has $4 \times 10^6$ erg/cc higher, the second magnetic recording layer has $1.2 \times 10^6$ to $2 \times 10^6$ erg/cc, and the third magnetic recording layer has $1 \times 10^6$ erg/cc or lower.

14. The perpendicular recording medium according to claim 13, wherein the magneto crystalline anisotropic energy $K_u$ of the third magnetic recording layer is $0.1 \times 10^6$ to $1 \times 10^6$ erg/cc.

* * * * *